US009407944B1

(12) United States Patent
Galdy et al.

(10) Patent No.: US 9,407,944 B1
(45) Date of Patent: *Aug. 2, 2016

(54) RESOURCE ALLOCATION OPTIMIZATION FOR CLOUD-BASED VIDEO PROCESSING

(71) Applicant: iStreamPlanet Co., Las Vegas, NV (US)

(72) Inventors: Alessio Galdy, Seattle, WA (US); Eric Juteau, Woodinville, WA (US); Jeffrey Alan Davis, Snohomish, WA (US); Mark Daniel VanAntwerp, Seattle, WA (US)

(73) Assignee: iStreamPlanet Co., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,128

(22) Filed: May 8, 2015

(51) Int. Cl.
| | |
|---|---|
| *H04N 7/173* | (2011.01) |
| *H04N 21/2385* | (2011.01) |
| *H04N 21/24* | (2011.01) |
| *H04N 21/218* | (2011.01) |
| *H04N 21/231* | (2011.01) |
| *H04N 21/643* | (2011.01) |
| *H04N 21/2743* | (2011.01) |

(52) U.S. Cl.
CPC ....... *H04N 21/2385* (2013.01); *H04N 21/2181* (2013.01); *H04N 21/23103* (2013.01); *H04N 21/2405* (2013.01); *H04N 21/2743* (2013.01); *H04N 21/64322* (2013.01)

(58) Field of Classification Search
CPC ............ H04N 21/2665; H04N 21/242; H04N 21/6125; H04N 21/64761; H04L 67/10
See application file for complete search history.

(56) References Cited

U.S. PATENT DOCUMENTS

| | | | |
|---|---|---|---|
| 5,742,821 | A | 4/1998 | Prasanna |
| 5,913,038 | A | 6/1999 | Griffiths |
| 6,110,220 | A | 8/2000 | Dave et al. |
| 6,195,680 | B1 | 2/2001 | Goldszmidt et al. |
| 6,407,680 | B1 | 6/2002 | Lai et al. |
| 6,571,282 | B1 | 5/2003 | Bowman-Amuah |
| 6,769,127 | B1 | 7/2004 | Bonomi et al. |
| 7,080,153 | B2 | 7/2006 | Monteiro et al. |
| 7,325,232 | B2 | 1/2008 | Liem |
| 7,761,591 | B2 | 7/2010 | Graham |
| 7,925,781 | B1 | 4/2011 | Chan et al. |

(Continued)

OTHER PUBLICATIONS

Final Office Action, U.S. Appl. No. 14/448,915, dated Jan. 21, 2016, 11 pages.

(Continued)

*Primary Examiner* — Oleg Asanbayev
(74) *Attorney, Agent, or Firm* — Nicholson De Vos Webster & Elliott, LLP

(57) ABSTRACT

A method executed by an electronic device to optimize resource utilization while processing media workflows by a video streaming platform is disclosed. In one embodiment, a request to initiate a set of training sessions is received, and for each training session, a set of training workflows to be processed is initiated and a task graph for each training workflow is created. Then a worker of the video streaming platform is assigned to each training session. The raw performance data from each assigned worker is then collected, and a platform performance profile is generated based on the raw performance data from the each assigned worker. The platform performance profile is used to predict resource requirements of media workflows to be processed by the video streaming platform. A system to perform the method and a storage medium storing instructions to perform the method are disclosed too.

15 Claims, 9 Drawing Sheets

(56) References Cited

U.S. PATENT DOCUMENTS

| | | | |
|---|---|---|---|
| 8,010,830 | B2 | 8/2011 | Hotta et al. |
| 8,015,564 | B1 | 9/2011 | Beyer et al. |
| 8,059,662 | B2 | 11/2011 | Moote et al. |
| 8,135,413 | B2 | 3/2012 | Dupray |
| 8,185,908 | B2 | 5/2012 | Taniguchi et al. |
| 8,589,992 | B2 | 11/2013 | Babic |
| 8,607,091 | B2 | 12/2013 | Asbun et al. |
| 8,745,628 | B2 | 6/2014 | Buco et al. |
| 8,752,112 | B2 | 6/2014 | Krasic et al. |
| 8,768,048 | B1 | 7/2014 | Kwatra |
| 8,959,370 | B2 | 2/2015 | Zomaya et al. |
| 8,984,520 | B2 | 3/2015 | Liu et al. |
| 9,038,086 | B2 | 5/2015 | Dees |
| 2003/0142670 | A1 | 7/2003 | Gould et al. |
| 2003/0163829 | A1 | 8/2003 | Coufal et al. |
| 2003/0208638 | A1 | 11/2003 | Abrams et al. |
| 2004/0047354 | A1 | 3/2004 | Slater et al. |
| 2004/0117427 | A1 | 6/2004 | Allen et al. |
| 2004/0128386 | A1 | 7/2004 | Oomoto et al. |
| 2006/0195602 | A1 | 8/2006 | Shibata et al. |
| 2007/0038567 | A1 | 2/2007 | Allaire et al. |
| 2007/0078768 | A1 | 4/2007 | Dawson |
| 2007/0101379 | A1 | 5/2007 | Perriera |
| 2007/0127667 | A1 | 6/2007 | Rachamadugu |
| 2007/0153679 | A1 | 7/2007 | Jost et al. |
| 2007/0237185 | A1 | 10/2007 | Perriera et al. |
| 2008/0187285 | A1 | 8/2008 | Thekkethil |
| 2008/0225698 | A1 | 9/2008 | Smith et al. |
| 2008/0307258 | A1 | 12/2008 | Challenger et al. |
| 2009/0070827 | A1 | 3/2009 | Barroso |
| 2009/0083279 | A1 | 3/2009 | Hasek |
| 2009/0254952 | A1 | 10/2009 | Sridhar et al. |
| 2009/0304004 | A1 | 12/2009 | Huynh Van et al. |
| 2010/0122040 | A1 | 5/2010 | Asai et al. |
| 2011/0022689 | A1 | 1/2011 | Piepenbrink et al. |
| 2011/0154358 | A1 | 6/2011 | Di Balsamo et al. |
| 2011/0167304 | A1 | 7/2011 | Asbun et al. |
| 2011/0246621 | A1 | 10/2011 | May, Jr. |
| 2015/0103837 | A1 | 4/2015 | Dutta et al. |
| 2016/0034306 | A1 | 2/2016 | Galdy et al. |
| 2016/0036693 | A1 | 2/2016 | Galdy et al. |
| 2016/0036886 | A1 | 2/2016 | Ito |

OTHER PUBLICATIONS

Non-Final Office Action, U.S. Appl. No. 14/448,996, dated Mar. 15, 2016, 22 pages.

Notice of Allowance, U.S. Appl. No. 14/448,915, dated Apr. 13, 2016, 10 pages.

Notice of Allowance, U.S. Appl. No. 14/708,135, dated Mar. 21, 2016, 30 pages.

Chen, et al., "A Directed Acyclic Graph based Detection for RBAC Based Secure Interoperation", IEEE, pp. 759-764, 2009.

Rao, et al, "Association Rule Mining Using FPTree As Directed Acyclic Graph", IEEE ICAESM, pp. 202-207, Mar. 30-31, 2012.

Roig, et al, "A New Task Graph Model for Mapping Message Passing Applications", IEEE Transactions on Parallel and Distributed Systems, vol. 18, No. 12, pp. 1740-1753, Dec. 2007.

Tao, et al., "Directed Acyclic Graph Version Model Applied in Product Structure Configuration", IEEE, pp. 1-4, 2008.

"AT&T Enhances Its Digital Media Solutions Portfolio With New Features That Expand Content Management and Delivery Capabilities", iStreamPlanet, Articles, http://www.istreamplanet.com/NewsItem.aspx?nid=113, (Apr. 13, 2010), 2 pages.

"iStreamPlanet Announces Flash Media Server 3.5 and HTTP Dynamic Streaming Support for the Adobe Flash Platform", iStreamPlanet, Articles, http://www.istreamplanet.com/NewsItem.aspx?nid=115, (May 11, 2010), 2 pages.

"iStreamPlanet announces official integration of Microsoft Silverlight Rough Cut Editor (RCE) into its Video Workflow Automation Platform (VWAP)", iStreamPlanet, Articles, http://www.istreamplanet.com/NewsItem.aspx?nid=110, (Mar. 12, 2010), 2 pages.

"iStreamPlanet announces Release of Its Video Workflow Automation Platform", iStreamPlanet, Articles, http://www.istreamplanet.com/NewsItem.aspx?nid=107, (Mar. 15, 2010), 2 pages.

"iStreamPlanet Announces Support for Microsoft Silverlight 4", iStreamPlanet, Articles, http://www.istreamplanetcom/NewsItem.aspx?nid=111, (Apr. 13, 2010), 2 pages.

"iStreamPlanet selected by NBC Sports to Provide Live Web Broadcast Experience of The 2010 US Open Golf Tournament at Pebble Beach and Championships 2010 at Wimbledon", iStreamPlanet, Articles, http://www.istreamplanet.com/NewsItem.aspx?nid=120, (Jun. 29, 2010), 2 pages.

"Record Interactive and Online Viewing for CTVOlympics.ca & RDSolympiques.ca: The Vancouver 2010 Olympic Winter Games in Review", iStreamPlanet, Articles, http://www.istreamplanet.com/NewsItem.aspx?nid=109, (Mar. 18, 2010), 2 pages.

"Spinnaker HD/7100", Inlet Technologies, www.InletHD.com., (May 2010), 2 pages.

"Spinnaker HD-X/8100", Inlet Technologies, www.InletHD.com., (May 2010), 2 pages.

"Spinnaker IP/6000", Inlet Technologies, www.InletHD.com., (May 2010), 2 pages.

Office Action, U.S. Appl. No. 12/789,106, dated Apr. 11, 2012, 26 pages.

Final Office Action, U.S. Appl. No. 12/789,106, dated Aug. 27, 2012, 30 pages.

Notice of Allowance, U.S. Appl. No. 12/789,106, dated Jul. 5, 2013, 22 pages.

Non-Final Office Action, U.S. Appl. No. 14/448,915, dated Sep. 1, 2015, 20 pages.

Liang et al., "Cross-Tree Adjustment for Saptialized Audio Streaming over Networked Virtual Environments", ACM, pp. 73-78, 2003.

Iqbal et al., "An Analytical Approach to Model Adaptive Video Streaming and Delivery", ACM, pp. 55-58, 2010.

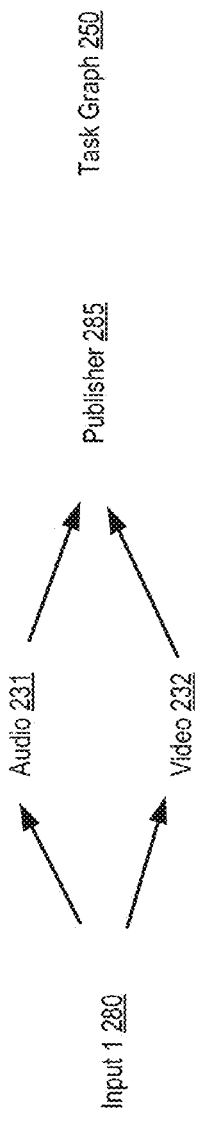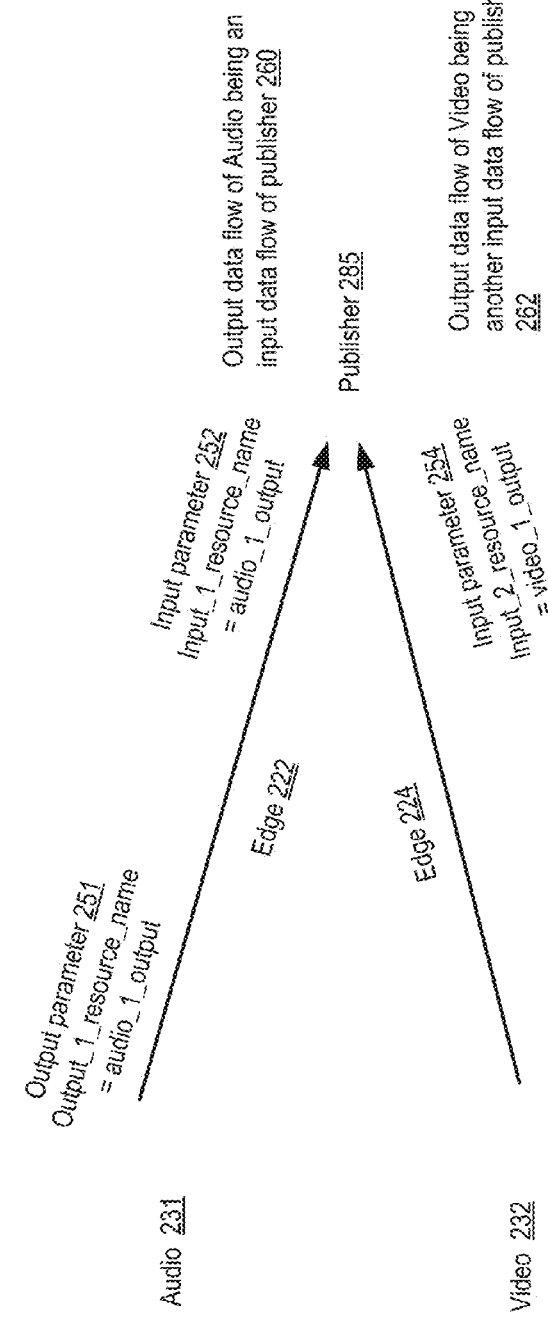
FIG. 2A
FIG. 2B

FIG. 3A — Portion of Summary of Raw Worker Performance Data 352

| Independent Variables 302 ||||||||  Dependent Variables 304 |
|---|---|---|---|---|---|---|---|---|
| Source Bitrate | Source Height | Frame Rate | Interlaced | Output Height | Output MPps | Output Layers | Output Bitrate | Avg CPU |
| 3000 | 480 | 30 | 1 | 480 | 24.5 | 6 | 3312 | 6.25 |
| 3000 | 480 | 30 | 1 | 480 | 24.5 | 6 | 3312 | 6.44 |
| 3000 | 480 | 30 | 1 | 480 | 24.5 | 6 | 3312 | 6.38 |
| 3000 | 480 | 30 | 1 | 480 | 24.5 | 6 | 3312 | 7.34 |
| 3000 | 480 | 30 | 1 | 480 | 24.5 | 6 | 3312 | 7.52 |
| 3000 | 480 | 30 | 1 | 480 | 24.5 | 6 | 3312 | 7.34 |
| 3000 | 480 | 30 | 1 | 480 | 24.5 | 6 | 3312 | 7.2 |

FIG. 3B — A set of Exemplary Parameters for a Performance Profile (e.g., through linear regression) 354

| | CPU Coefficients | GPU Coefficients |
|---|---|---|
| Constant | -29.18716796 | -25.32896718 |
| Source Bitrate | 0.000385802 | 1.16267E-05 |
| Source Height | 0.00703426 | 0.003967929 |
| Frame Rate | 0.131604014 | 0.024717859 |
| Interlaced | 1.138420996 | 0.129813125 |
| Output Height | -0.045721915 | -0.033735554 |
| Output MPixPerSec | 0.253087429 | 0.276254529 |
| Output Layer | 8.102607868 | 8.679215311 |
| Output Bitrate | -0.000929188 | -0.00069448 |

FIG. 3C — Portion of An Exemplary Platform Performance Profile 356

| Task Type | Multiple H.264 Encoding | Multiple H.264 Encoding | Multiple H.264 Encoding | Multiple H.264 Encoding |
|---|---|---|---|---|
| Source Video | H.264 Video | H.264 Video | MPEG 2 Video | MPEG 2 Video |
| Decoder Type | Software | Hardware | Software | Hardware |
|  | CPU Coefficients | CPU Coefficients | CPU Coefficients | CPU Coefficients |
| Constant | -29.18716796 | -18.15896718 | -14.56405858 | -64.36203934 |
| Source Bitrate | 0.000385802 | 0.000308622 | 0.000189948 | 0.000335003 |
| Source Height | 0.00703426 | 0.000644061 | 0.01328099 | 0.020518766 |
| Frame Rate | 0.131604014 | 0.05771997 | 0 | 0 |
| Interlaced | 1.138420996 | 2.257858168 | 0 | 0 |
| Output Height | -0.045721915 | -0.024895267 | 0.061568207 | 0.213675508 |
| Output MPixPerSec | 0.253087429 | 0.081596592 | 0.086672932 | -0.223241029 |
| Output Layer | 8.102607868 | 5.324769429 | 0 | 0 |

Permutations of independent Variables 312; Constant and variable coefficients for linear regression 314

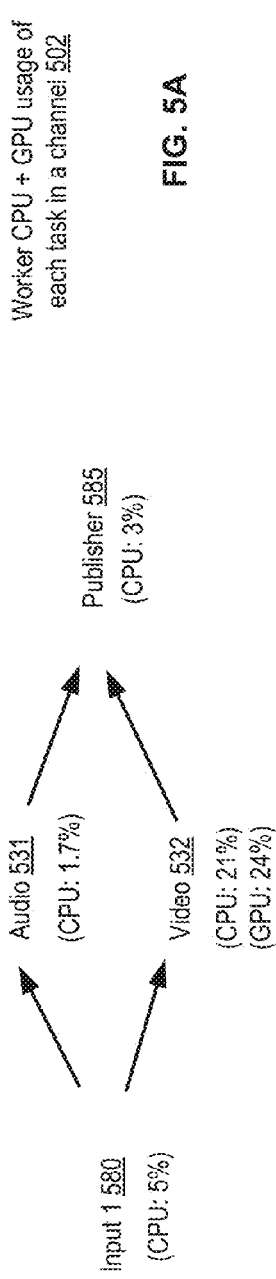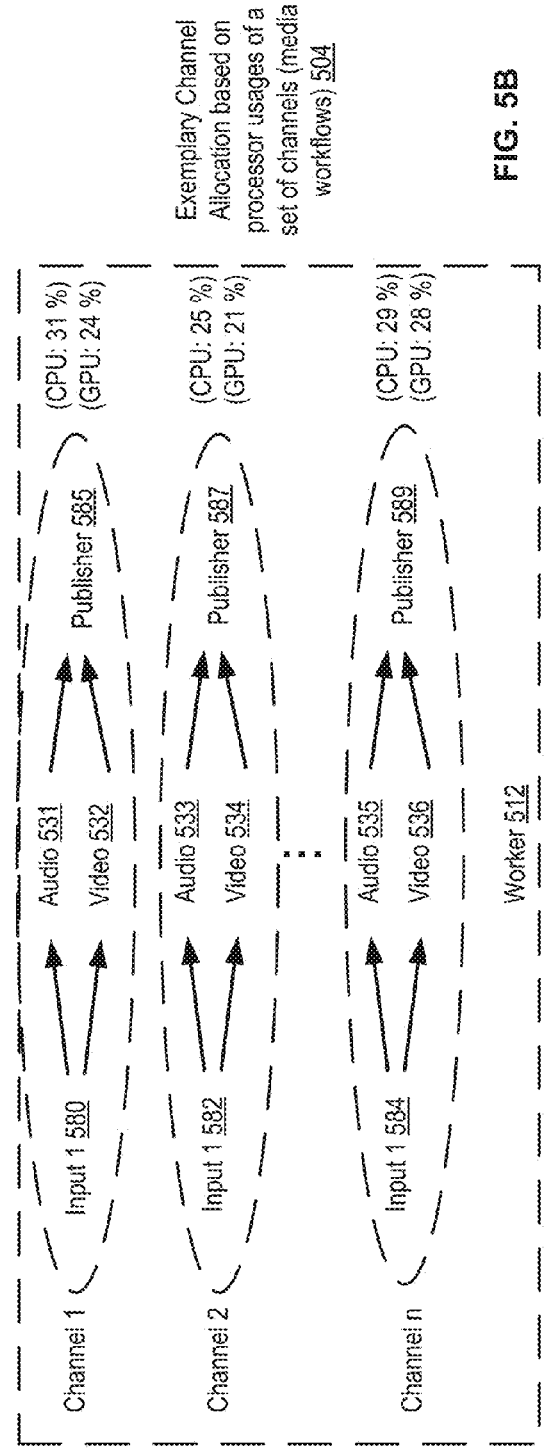
FIG. 5A
FIG. 5B

US 9,407,944 B1

RESOURCE ALLOCATION OPTIMIZATION FOR CLOUD-BASED VIDEO PROCESSING

RELATED APPLICATIONS

This application is related to co-pending U.S. application Ser. No. 14/708,135, entitled "Coordination of Fault-tolerant Video Stream Processing in Cloud-based Video Streaming System," and co-pending U.S. application Ser. No. 14/708,139, entitled "Coordination of Video Stream Timing in Cloud-based Video Streaming System," both filed herewith, which are incorporated herein by reference.

FIELD OF INVENTION

The embodiments of the invention are related to the field of delivering media contents over a network cloud. More specifically, the embodiments of the invention relate to methods and systems for supporting resource allocation optimization for cloud-based video processing.

BACKGROUND

Cloud computing is now ubiquitous in both enterprise and consumer settings. In cloud computing, data and applications are accessed over the Internet instead of requiring local storage and compute resources, and instead of owning all the hardware where the data resides and the software applications execute, an enterprise or a consumer (the "client" or "tenant") utilizes hardware and software resources supplied by a cloud computing provider to store the data and run the applications. Relying on sharing of resources among numerous clients, the cloud computing infrastructure (sometimes referred to as Infrastructure as a service (IaaS)) satisfies elastic demand spikes and achieves economies of scale thus becoming popular in various industries. In an IaaS model, computing resources are often offered as a number of virtual machines to a client requesting computing resources, and a hypervisor manages the offered virtual machines.

The IaaS offerings of cloud computing providers come in a multitude of sizes and capabilities. Some cloud computing providers offer high computing power processors so that a virtual machine in a single processor may provide required computing resource for a client's computing need. Others offer lower computing power processors in a compact packaging so that the combined lower computing power processors may offer enough computing resources for a client's computing need. The different offerings of the cloud computing providers are often advertised to clients. Yet, it is still challenging for a client to determine which offerings are most suitable for particular applications, particularly for demanding applications such as video processing.

For video processing, a client may have different media contents to be processed using a variety of media processing operations, and these different contents and operations often require significantly different computational resources. For example, media content consisting of talking heads takes much less processing power than a live broadcast consisting of complex content such as auto racing. Also, the required computational resources also depend on the type of computing resources offered. For example, some media processing operations work well with an offering integrating central processing units (CPUs) and graphics processing units (GPUs) so that these media contents require less overall computing resources than another offering of CPUs only. Yet, the intuitive understanding of the relationship between media content, media processing operations, and required processing power is insufficient to make simple quantitative determination as of how much processing power is needed for a set of media content and media processing operations. Thus, a client typically overestimates the computing resources required when configuring a cloud computing provider to process video in order to have enough computing resource for the whole video processing session. The processing power requirement is based on the worst case scenario, thus it can be inefficient for the client to process media contents in a cloud environment in this manner.

SUMMARY

A method for supporting resource allocation optimization for cloud-based video processing is disclosed. The method is executed by an electronic device implementing a video streaming platform and it optimizes resource utilization while processing media workflows by the video streaming platform. The method includes receiving a request to initiate a set of training sessions, the request including a set of parameters describing characteristics of each training session in the set of training sessions. For each training session in the set of training sessions, the method includes initiating a set of training workflows to be processed by the video streaming platform. The method further includes creating a task graph for each training workflow in the set of training workflows, the task graph being a directed acyclic graph of tasks with each node of the task graph representing a media processing task and each edge of the task graph representing a data flow across two tasks and a corresponding input and output of each task. The method further includes: assigning a worker from a set of workers of the video streaming platform to each training session; collecting raw performance data from each assigned worker after each set of training workflows is processed; and generating a platform performance profile of the video streaming platform based on the raw performance data from the each assigned worker, wherein the platform performance profile is used to predict resource requirements of media workflows to be processed by the video streaming platform.

An electronic device to support resource allocation optimization for cloud-based video processing is disclosed. The electronic device serves as an orchestrator cluster of a video streaming platform, and it receives a request to initiate a set of training sessions, the request including a set of parameters describing characteristics of each training session in the set of training sessions. For each training session in the set of training sessions, the electronic device initiates a set of training workflows to be processed by the video streaming platform. The electronic device creates a task graph for each training workflow in the set of training workflows, the task graph being a directed acyclic graph of tasks with each node of the task graph representing a media processing task and each edge of the task graph representing a data flow across two tasks and a corresponding input and output of each task. The electronic device assigns a worker from a set of workers of the video streaming platform to each training session, collects raw performance data from each assigned worker after each set of training workflows is processed, and generates a platform performance profile of the video streaming platform based on the raw performance data from the each assigned worker, where the platform performance profile is used to predict resource requirements of media workflows to be processed by the video streaming platform.

A non-transitory machine-readable storage medium for supporting resource allocation optimization for cloud-based video processing is disclosed. The storage medium has instructions stored therein, which when executed by a processor, cause the processor to perform operations in an electronic device. The electronic device implementing a video streaming platform, and the operations optimize resource utilization while processing media workflows by the video streaming platform. The operations include receiving a request to initiate a set of training sessions, the request including a set of parameters describing characteristics of each training session in the set of training sessions. For each training session in the set of training sessions, the operations include initiating a set of training workflows to be processed by the video streaming platform. The operations further include creating a task graph for each training workflow in the set of training workflows, the task graph being a directed acyclic graph of tasks with each node of the task graph representing a media processing task and each edge of the task graph representing a data flow across two tasks and a corresponding input and output of each task. The operations further include: assigning a worker from a set of workers of the video streaming platform to each training session; collecting raw performance data from each assigned worker after each set of training workflows is processed; and generating a platform performance profile of the video streaming platform based on the raw performance data from the each assigned worker, wherein the platform performance profile is used to predict resource requirements of media workflows to be processed by the video streaming platform.

Embodiments of the disclosed techniques use training sessions to understand the performance characteristics of a video streaming platform and generate a platform performance profile of the video streaming platform. The platform performance profile can then be used to predict the resource need of an incoming video source and set of media processing operations, and based on the resource needs and the available resources, the video streaming platform may allocate the available resources efficiently for the video source.

BRIEF DESCRIPTION OF THE DRAWINGS

FIG. 2A illustrates an exemplary task graph according to one embodiment of the invention.

FIG. 2B illustrates the relationship between adjacent nodes in a portion of a task graph according to one embodiment of the invention.

FIG. 3A illustrates a portion of summary of raw worker performance data according to one embodiment of the invention.

FIG. 3B illustrates a set of variable coefficients and constant for one set of variables according to one embodiment of the invention.

FIG. 3C illustrates a portion of an exemplary platform performance profile according to one embodiment of the invention.

FIG. 5A illustrates a task graph for a video workflow including predicted CPU & GPU requirements according to one embodiment of the invention.

FIG. 5B illustrates an exemplary channel allocation in a worker of a video streaming platform according to one embodiment of the invention.

DETAILED DESCRIPTION

Figure 1:
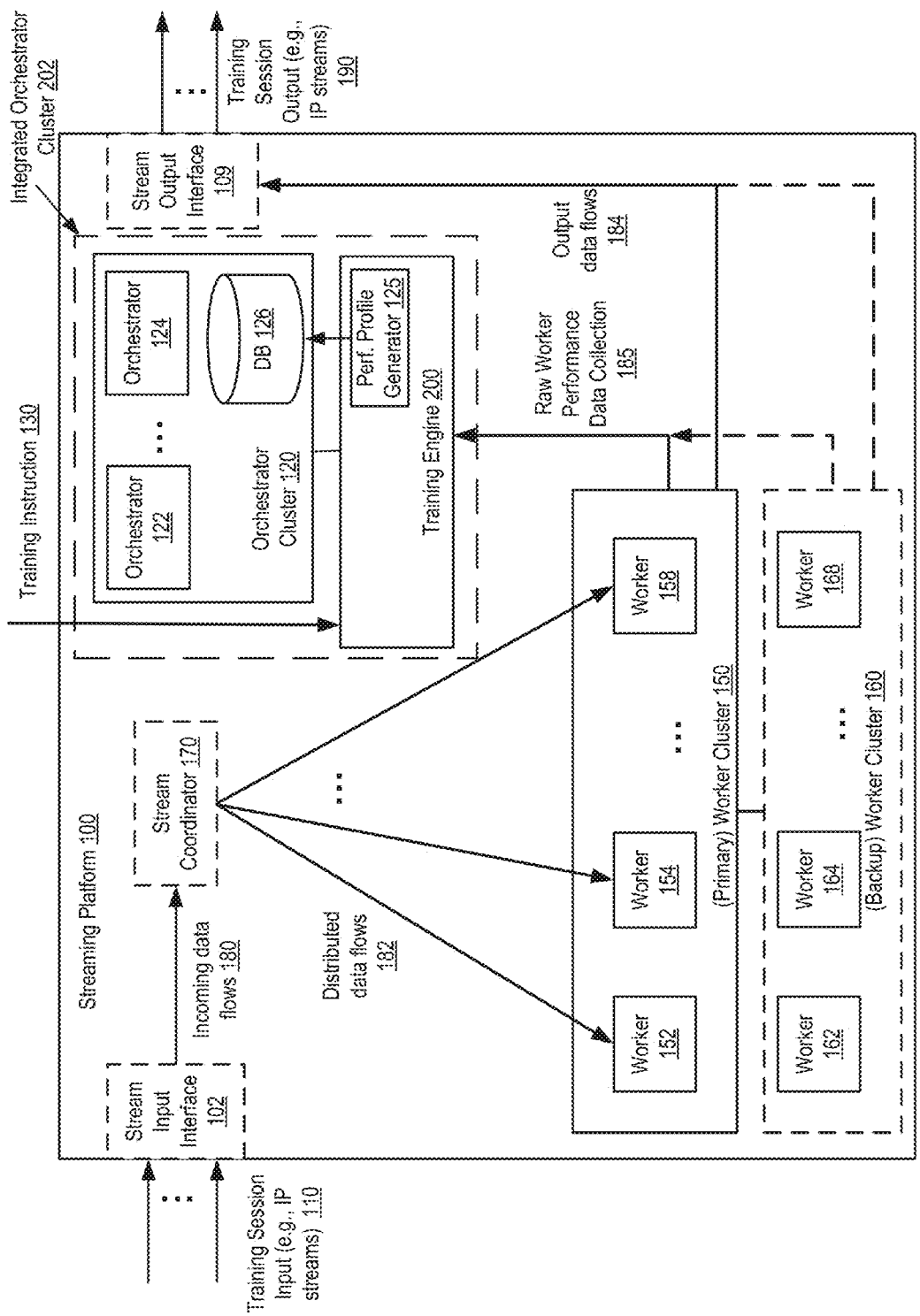
FIG. 1 illustrates characteristics of a video streaming platform in a cloud computing environment according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier)

(e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices.

Video Streaming Platform in a Cloud Computing Environment

FIG. 1 illustrates characteristics of a video streaming platform in a cloud computing environment according to one embodiment of the invention. A streaming platform 100 (also referred to as a video streaming platform, and the two terms are used interchangeably in the specification) is a computing system, and it contains one or more machines including one or more server computers, gateways, routers, or other computing/networking electronic devices. A streaming platform operator manages operations of the streaming platform 100, yet some or all of the electronic devices within the streaming platform 100 may be owned by a third party (e.g., a cloud provider/operator such as Amazon.com®, Microsoft®, Google®, CenturyLink®, Rackspace®, or Computer Sciences Corporation (CSC®)). That is, a cloud computing environment operated by a cloud provider/operator may host the streaming platform 100.

The streaming platform 100 receives its data flow input at a stream input interface 102 in one embodiment. For example, video sources to be processed by the streaming platform 100 enters through the stream input interface 102. A video source contains one or more Internet Packet (IP) packet streams in one embodiment. The IP packet streams may contain one or more live video feeds. A live video feed may be video of a live event or live performance, or may be video of a prerecorded event being played back according to a schedule. The live video feed may be a video broadcasted over cable, satellite, or over-the-air. Note the terms "video source," "video stream," and "video feed," as used interchangeably herein, refer to the video and corresponding audio of the particular recorded event (e.g., TV show, live performance, sporting event, etc.), but also may include video only. Additionally the video source (sometimes referred to as the video and audio streams) of the streaming platform 100 may contain only audio (e.g., an Internet radio stream). The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD).

In a video streaming platform such as the streaming platform 100, a workflow, also referred to as a channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). A training workflow is a workflow for a training session, and a media workflow is a workflow for a video source that is not within the set of training sessions, and the video source contains client's video to be processed by a video streaming platform. A training session consists of a set of training workflows, each with their own training video source.

Training session input 110 are a set of video streams to represent video sources. Typically a training session is a short video stream (e.g., a 5~30 minute video clip). Each training session may represent a type of video source, thus a set of training sessions may represent many different types of video sources. For example, the set of training sessions may include a plurality of video clips in the H.264 video format, where each video clip has a unique combination of bit rate, frame rate and source height. The set of training sessions may also include a plurality of video clips in the MPEG-2 video (MPEG is short for moving pictures expert group) format, and again each video clip has a unique combination of bit rate, frame rate and source height. Through the training sessions, the streaming platform 100 may be exposed to representative video sources of a wide variety of source characteristics and training workflow permutations. By automating the training process through the training engine and/or orchestrator cluster, the operator of the video streaming platform will be able to consistently and accurately create a complete set of performance data that demonstrates the impact of changes in the training source and training workflow characteristics on the measured resource usage. The characterization in turn facilitates prediction of resource usage of an incoming video source in the future. Doing this manually without the automated training process would be time consuming if not impossible, and would be time and cost prohibitive when done repeatedly over time.

A video source may be "pushed" to the streaming platform 100 where the video source is IP packet streams such as the MPEG-transport streams (MPEG-TS). The IP packet streams logically flow to streaming platform 100 from an external source thus the video source is referred to as being pushed to the streaming platform 100.

A video source may also be "pulled" by a processing unit (referred to as a worker) of streaming platform 100, where the worker runs one or more processing tasks. The worker may initiate a Transmission Control Protocol (TCP) connection to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 102 or the stream coordinator 170. The pull of video feeds may be implemented through the real time messaging protocol (RTMP), where the processing task includes a RTMP capture task.

The stream input interface 102 is a logical input point for data flows into the streaming platform 100. It may not be present as a physical entity of the streaming platform 100 in one embodiment. From the stream input interface 102, a video source becomes an incoming data flow 180. The incoming data flow contains data of one or more video and audio streams. In one embodiment, the incoming data flow is transmitted in user datagram protocol (UDP) packets. The incoming data flow 180 may optionally go to a stream coordinator 170, which converts unicasts data flow into distributed data flows 182.

Workers may be organized as worker clusters in a streaming platform. In the streaming platform 100, workers 152-158 are in a primary worker cluster 150, which contains workers actively working on processing tasks. Workers 162-168 are in a backup worker cluster 160, which contains workers remains standby thus provides redundancy and robustness for the streaming platform 100. Workers perform tasks through coordination with one or more orchestrators, which may form an orchestrator cluster.

The orchestrator cluster 120 contains orchestrators 122-124 and an orchestrator database 126 that stores data for operations of the orchestrators. The orchestrators may form load-balanced groups within an orchestrator cluster, and the orchestrator cluster may be paired with another separately located orchestrator cluster (e.g., the other orchestrator cluster being at a different rack or even a different geographic location) for redundancy and robustness purpose too. An orchestrator creates a workflow for a video source in the streaming platform 100, and it may also host services responsible for work scheduling and overall system health monitoring and management. In some embodiments, the orchestrator database 126 is optional. For example, each of the orchestrators 122-124 contain a distributed in-memory storage to store information for the operations by the orchestrator 122-124 and/or orchestrator cluster 120. In alternative, a database outside of the orchestrator cluster 120 may store the information for the operations by the orchestrator 122-124 and/or orchestrator cluster 120.

Workers are coupled to one or more orchestrators, and the workers execute processing tasks on the distributed data flows 182. The data flows are processed and the workers produce output data flows 184. The output data flows 184 may optionally transmit to a stream output interface 109, a logical output point for the data flows going out of the streaming platform 100. Note both the stream input interface 102 and the stream output interface 109 may be integrated into parts of worker functions and they may not be individual physical units of the streaming platform 100.

Output data flows goes to the training session output 190, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 100. The hosts are managed by a cloud provider and they may concurrently host applications other than the video streaming platform. Thus, the worker hosts are not dedicated to the streaming platform and they are allocated to the streaming platform as needed and according to coordination of the orchestrators.

For the streaming platform 100, a graph of tasks is used to process a workflow. During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

FIG. 2A illustrates an exemplary task graph according to one embodiment of the invention. Task graph 250 contains one input node, an input 1 at 280. The input 1 represents an input processing task (sometimes referred to as an ingest task), which is to receive and prepare the video source for further processing. The output of the input 1 is sent to an audio 231 and a video 232. The nodes of the audio 231 and video 232 represent processing tasks associated with the respective audio and video layers of the video source. After the audio and video are processed through transcoding operations at 231-232 (sometimes referred to as audio transcoding and video transcoding respectively), the outputs are sent to a publisher 285, where the processing task is to publish the processed video source in desired output format(s) to the desired destination(s). While the majority of the nodes of task graph 250 only have a single input and/or a single output, the layout is for simplicity of illustration. A task graph may contain tens or even hundreds of nodes, and each node may have multiple inputs and multiple outputs.

FIG. 2B illustrates the relationship between adjacent nodes in a portion of a task graph according to one embodiment of the invention. The illustrated portion of the task graph is task graph 250 in FIG. 2A, and the illustrated portion includes the audio 231, the video 232, the publisher 285, and edges 222-224. The Audio 231 produces one output. The output contains an output parameter 251, which is referred to by an output resource name (output_1_resource_name) and the value is audio_1_output. Represented by the edge 222, the output of the audio 231 is an input of the publisher 285, and that input contains an input parameter 252, which is referred to by an input resource name (input_1_resource_name), and the value of the input parameter to the publisher 285 is the same as the value of the output parameter 251, audio_1_output. Similarly, the video 232 produces an output containing an output parameter 253, which is referred to as output_1_resource_name, and the value is video_1_output. The output of the video 232 is another input of publisher 285, and that input contains an input parameter 254, which is referred to by input_2_resource_name and its value is the same (video_1_output).

It is to be noted that while the input and output parameters in the example are single values respectively, some edges of a task graph may contain a plurality of input parameters and/or a plurality of output parameters, in which case the input parameters and output parameters are referred to as the input parameter set and the output parameter set respectively. Each of the input and output resource names represents resource(s) involved for the respective inputs and outputs. The reading and writing of the inputs and outputs are done via API calls to a service called the segment store that runs on every worker in one embodiment.

It is also to be noted that each node in a task graph represents a task to be performed by a worker in a video streaming platform such as the streaming platform 100. In some embodiments, all the tasks in the task graphs may be performed by a single worker. The single worker may be implemented in a virtual machine by a computing device with a more powerful processor such as an Intel® Haswell processor with 18+cores, or it may be implemented in a virtual machine by a computing device with an aggregation of less powerful processors such as a set of Intel® Xeon E3-1200 processors assembled in a compact rack. In some embodiments, the single worker is implemented by a computing device with an integrated GPU. Because of GPU's highly parallel structure, it is typically more effective than CPU when large blocks of data need to be processed in parallel, and that makes certain GPUs more efficient than CPUs for processing video related tasks in a task graph. In order to assign a task graph to a worker, the streaming platform orchestrator needs to estimate the absolute processing need or the percentage of CPU/GPU to be taken by the task graph. When all workers in the streaming platform use the same virtual machine type, the percentage of CPU/GPU to be taken is a simpler and sufficient measure of the resource need. In alternative, when workers in the streaming platform use a variety of virtual machine types, the absolute processing need of the task graph may be estimated. When a task graph is performed by more than one worker, the streaming platform operator needs to estimate the resource need (such as need of processing power) of each node of the task graph, so that an available resource of a worker may be allocated to a task node of the task graph where the task node requires less resource than the available resource of the task.

Overall, streaming platform 100 ingests video sources, transcodes, and transforms the video sources into desired one or more formats for publication and then outputs the resulting video data. The streaming platform is a distributed architecture using cloud resources, and it is a flexible, scalable, and efficient platform for video processing.

Characterizing a Streaming Platform

Referring to FIG. 1, for characterizing the streaming platform 100, the streaming platform 100 includes a training engine 200. The training engine 200 receives training instructions 130, which may be in the form of an application programming interface (API) call. The training instructions 130 describe the characteristics of the set of training sessions and the expected workflows and sources for each of the training sessions within the set.

The training engine 200 and/or the orchestrator cluster 120 initiates a set of training workflows for each training session based on the training instructions 130 in one embodiment. For each workflow, a task graph is created. The training engine 200 or the orchestrator cluster 120 also assigns a worker from workers of the streaming platform 100 to each training session in one embodiment.

In one embodiment, the training instructions 130 include at least one of the following: (1) one or more training session input 110 that includes the training video sources to be used; and (2) one or more streaming platform workflow configuration variables of the streaming platform. Exemplary streaming platform workflow configuration variables include the CPU-based versus GPU-based decoding of a video source, and the desired quality versus speed configuration to use while encoding the video source. An exemplary workflow includes the desired audio/video transcoding operations and the desired publishing operations.

The training engine 200 coordinates execution of individual training sessions using the training session input 110 by workers in worker clusters 150/160 according to the training instructions 130. In one embodiment, the execution of the training sessions is performed serially according to the training instructions 130.

The training engine 200 causes the set training session input 110 to be routed to the assigned workers of the streaming platform 100. The training engine 200 monitors the execution of the training sessions through performance of the training workflows at the assigned workers throughout the training sessions; and once the assigned workers complete processing of the training workflows, the training engine 200 causes the training workflows to be terminated.

During the execution of the training sessions, the training engine 200 enables local collection of detailed, task-specific CPU/GPU performance data on the streaming platform resources (the performance data may be collected from the orchestrators and/or the workers). The training engine 200 collects the raw performance data (such as raw worker performance data collection 185) from the orchestrators and/or the workers and place it on a storage device (e.g., the orchestrator database 126 or a storage elsewhere in the streaming platform 100 or a storage outside of streaming platform 100).

The collected raw performance data are then analyzed by a performance profile generator 125 to generate a platform performance profile of the streaming platform 100. The generation of the platform performance profile starts with summarizing the collected raw performance data in one embodiment.

For each training workflow during a training session, a CPU resource usage of each task within the training workflow (ingest, audio/video transcoding, publishing, etc.) is converted to a set of data including the training workflow configuration variables, training source attributes, training workflow variables, and the collected CPU resource usage such as the average, the $90^{th}$ percentile, and the maximum CPU usages (other granularities of CPU usage information may be collected and analyzed too) across multiple samples. FIG. 3A illustrates a portion of summary of raw worker performance data according to one embodiment of the invention.

The set of data is presented in rows of data in FIG. 3A, and for each row of data, the source attributes (such as the source bit rate, source height in pixels, the source frame rate, and whether the source is interlaced or not), the training workflow configuration variables (such as output height in pixels, and output megapixels per second (MPps), the number of output layers, and the total output bit rate), and the average CPU usage in percentage of the processor resource are listed. The average CPU is an average in a period of time: for example, the CPU usage may be sampled every five seconds, and the average CPU may be the average of the sampled CPU usages of one to five minutes. Although not illustrated, the CPU resource usage such as the $90^{th}$ percentile and the maximum CPU usages are very important in some applications for some clients, and they may be given more weight or used exclusively in generating the platform performance profile.

It is to be noted that also not illustrated in FIG. 3A is GPU usage data. Some video streaming platforms provide integrated CPU and GPU processing resources for processing video sources, in which case, the training engine 200 also collects and analyzes the GPU usage, including the average, the $90^{th}$ percentile, the maximum, and/or other granularities of GPU usages. The summary of GPU usage data may be summarized similarly as the CPU usage data.

The summarized processor usage data are then analyzed by the performance profile generator 125 to generate the platform performance profile. In one embodiment, the performance profile generator 125 performs a linear regression analysis on the summarized processor usage data. The linear regression analysis takes as input the set of data including the training workflow configuration variables, source attributes, training workflow variables, and the measured processor usages. As illustrated in FIG. 3A, the exemplary set of data including the training workflow configuration variables and source attributes is referred to independent variables 302, which are the ones characterizing the training workflows. The processor usages such as average CPU is referred to as dependent variable 304, whose value depends on the independent variables 302.

In one embodiment, the linear regression analysis is to determine a constant and set of variables coefficients so that for a given set of independent variables, one may calculate the dependent variable with a linear equation. For example, assuming a set of independent variables are source bit rate $X_1$, source height in pixels $X_2$, source frame rate $X_3$, whether the source is interlaced or not $X_4$, output height in pixels $X_5$, and output megapixels per second (MPps) $X_6$, the number of output layers $X_7$, and the total output bit rate $X_8$; and the dependent variable is the average CPU usage $Y_1$. The linear regression analysis is to determine the value of the dependent variable utilizing a linear equation with a set of variable coefficients $A_1$-$A_8$ and a constant C for the set of independent variables $X_1$-$X_8$, where $Y_1=A_1*X_1+A_2*X_2+A_3*X_3+A_4*X_4+A_5*X_5+A_6*X_6+A_7*X_7+A_8*X_8+C$. Thus, the key is to generate the variable coefficients $A_1$-$A_8$ and the constant C. In another embodiment, the independent variables may be derived from source attributes and workflow characteristics by logarithmic or exponential functions in order to provide an optimal linear equation.

With the given set of independent variables, the calculation of the variable coefficients and the constant is known in the art. For example, Microsoft® Excel provides regression as a data analysis tool for determines the variable coefficients and the constant (the constant is called Intercept in Microsoft® Excel). Using mathematical tools such as Microsoft® Excel (or other tools such as MATLAB® or Wolfram Mathematica®) or by using well understood statistical techniques such as weighted least squares, the performance profile generator 125 may generate the set of variable coefficients and the constant for a set of independent variables to calculate the dependent variable(s).

FIG. 3B illustrates a set of variable coefficients and constant for one set of variables according to one embodiment of the invention. The set of exemplary parameters for a performance profile 354 includes the constant and the ordered variable coefficients for the variables (source bit rate, source height in pixels, source frame rate, whether the source is interlaced or not, output height in pixels, and output megapixels per second (MPps), the number of output layers, and the total output bit rate). The set of parameters include variable coefficients for both CPU and GPU usages. The set of parameters may be used to calculate CPU/GPU usages. For example, the first set of parameters is for the linear equation $Y_1=0.000385802*X_1+0.00703426*X_2+0.131604014*X_3+1.138420996*X_4+(-0.045721915)*X_5+0.253087429*X_6+8.102607868*X_7+(-0.000929188)*X_8+(-29.18716796)$.
With a known set of independent variables, the dependent variable here, the CPU usage may be calculated.

It is to be noted that a set of variable coefficients and constant may be associated with only a particular type of tasks, and the selection of independent variables may be different for different tasks. For example, the independent variables above includes the source frame rate, which is the frame rate of a video, thus the independent variable is necessary for task such as video transcoding such as the video 232 in FIG. 2A. However, for the audio 231, there is no source frame rate, thus the source frame rate is not an independent variable to determine the dependent variable of CPU usage of the task of audio transcoding. In order to calculate the variable coefficients to perform linear regression, one needs to select the relevant independent variable values first.

The set of variable coefficients and the constant is typically different for different selection of independent variables. For example, different encoding mechanism often results in different processor usage characteristics: The video source encoded in the H.264 format generally has different characteristics in using CPU/GPU sources in a video streaming platform comparing to another video source encoded in the MPEG-2 format. Thus, the set of variable coefficients and the constant for a video source encoded in the H.264 format generally will be different from that for another video source encoded in the MPEG-2 format, even if all the other parameters of the training workflow configuration variables, source attributes, and training workflow variables are the same. Similarly, the change of other parameters may also cause the set of variable coefficients and the constant to be different. Thus, for each permutation of the training workflow configuration variables, source attributes, and training workflow variables, a set of variable coefficients and a constant may be generated through a linear regression.

FIG. 3C illustrates a portion of an exemplary platform performance profile according to one embodiment of the invention. FIG. 3C may be view as the continuation of FIG. 3B and FIG. 3C covers a set of permutations of selection of relevant training workflow configuration variables, source attributes, and training workflow variables. The permutations of independent variables 312 illustrate the selection of training workflow configuration variable/attributes, which may be predetermined with each training session, thus a set of training sessions may cover all the permutations. The constant and variable coefficient for linear regression illustrates the constant and variable coefficient for each of the illustrated permutations. It is to be noted that only the values for CPU usage is illustrated, but a platform performance profile may also include a set of data for GPU, similar to what is illustrated in FIG. 3C, using data such as the ones illustrated in FIG. 3B. Additionally, it is to be noted that one platform performance profile is for one specific task type in the task graph in one embodiment. For example, the platform performance profile illustrated in FIG. 3C may be for the video 232, a node of task graph 250 illustrated in FIG. 2A. Thus, the streaming platform 100 may have a set of platform performance profiles, each for one task type (e.g., ingesting, audio/video transcoding, publishing, etc.) of a task graph in the video streaming platform.

The permutations of independent variables 312 illustrate only three types of settings, task types, source video, and decoder type. Different embodiments may have other types of settings (such as encoder quality/speed value setting) to generate the sets of variable coefficients and the constants, and in those different embodiments, the sets of variables may not be variables $X_1$-$X_8$, thus the linear regression analysis may result in variable coefficients other than $A_1$-$A_8$ as illustrated above. The principle discussed herein above may easily apply to a scenario where raw data from a set of $X_1$-$X_N$ variables are collected, and variable coefficients $A_1$-$A_N$ and constant C' are computed through the linear regression where N is an integer.

It is to be noted the linear regression discussed herein above is a simple form of linear regression, and more sophistic ones such as polynomial regression, ordinary least squares, general linear model, discrete choice, logistic regression, etc.

may also be used to generate a platform performance profile using the raw performance data.

The example given so far for deriving a platform performance profile describes the platform performance profile characterizing processor resource usages, being CPU and/or GPU usages. The platform performance profile does not need to be so limited. For example, a platform performance profile may be used to characterize the completion speed of tasks and associated workflows, for cases where both live media processing and on-demand media processing occur in the same streaming platform. The platform performance profile for completion speed may follow the similar steps discussed herein. Additionally, the platform performance profile for processor resource usage and the platform performance profile for completion speed may coexist for a single video streaming platform in one embodiment.

Referring back to FIG. 1, in one embodiment, the performance profile generator 125 generates a platform performance profile, which is sent to the orchestrator database 126 (the database of orchestrator cluster 120). The platform performance profile is stored in the training engine 200 or a data storage outside of the streaming platform 100 in alternate embodiments. Additionally, while the orchestrator cluster 120 and the training engine 200 may be implemented separately (e.g., hosted at different virtual machines), the orchestrator cluster 120 and the training engine 200 may be integrated too. The integrated orchestrator cluster 202 represents such implementation. The platform performance profile enables predictive modeling of resource requirement for specific task types in a media workflow initiated for a video source to be process by a video streaming platform, as discussed in more details herein below.

Predicting Resource Requirements of Media Workflows

Figure 4:
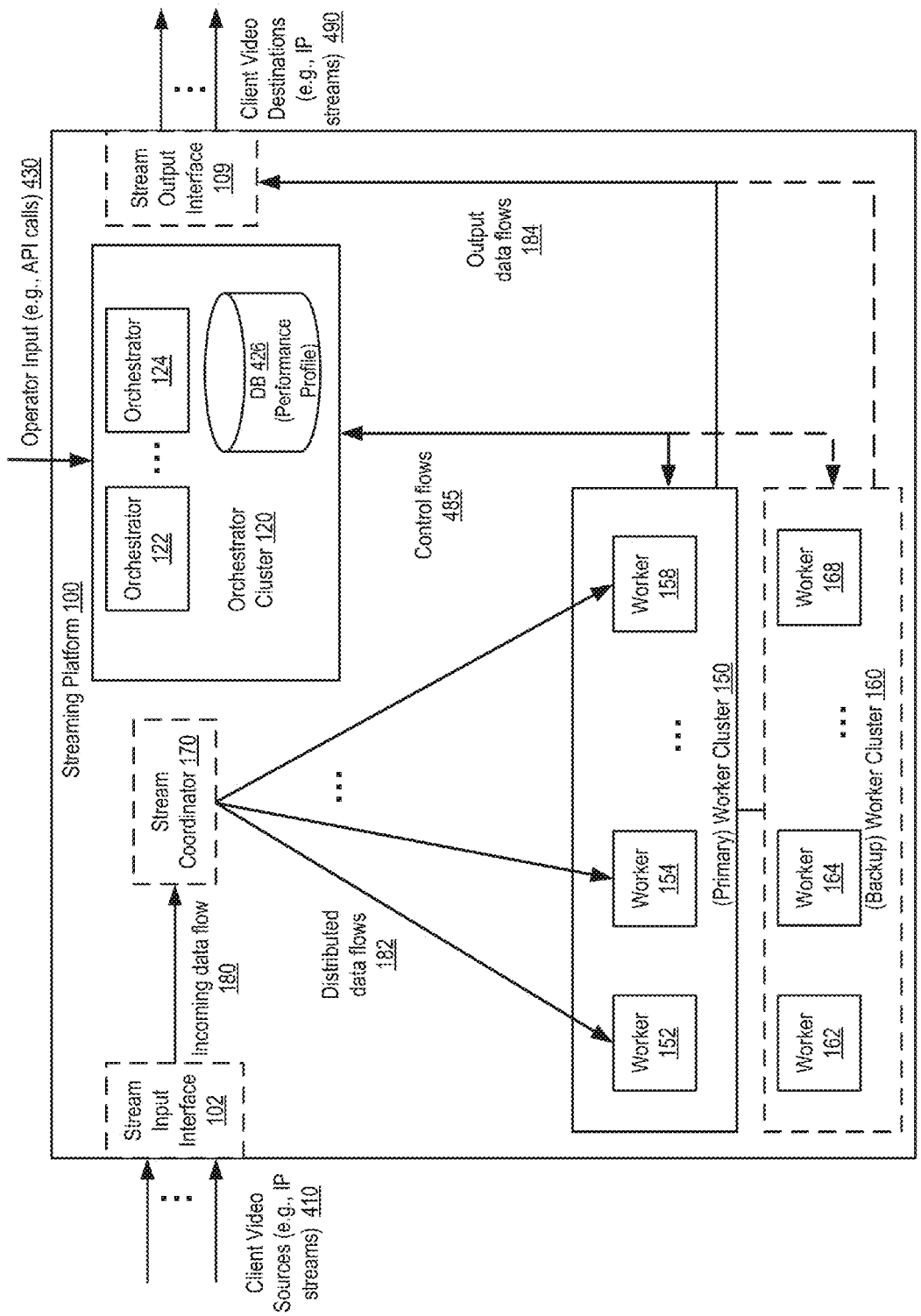
FIG. 4 illustrate predicting resource requirements based on a platform performance profile according to one embodiment of the invention.

The platform performance profile is to be used for predicting resource requirements, and FIG. 4 illustrate predicting resource requirements based on a platform performance profile according to one embodiment of the invention. FIG. 4 is similar to FIG. 1, thus only the different entities are discussed.

Referring to FIG. 4, the platform performance profile is saved in a database 426, according to one embodiment. The training engine, which produces the platform performance profile, is no longer shown as the training is completed already. FIG. 4 illustrates processing of video source of clients, thus the operation starts with receiving a request such as an operator input (e.g., an API call) at 430 in one embodiment. The request (which may be referred to as a channel creation request) may contain a variety of parameters describing the video source and the expected media processing operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Microsoft© PlayReady, Adobe© Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 120 routes client video sources 410, which are the one or more video sources discussed in relation to FIG. 1. The orchestrator cluster 120 creates a media workflow for one client video source, utilizing a directed graph of tasks, and the so called task graph is a directed acyclic graph (DAG) of tasks for processing the client video source. Each task graph contains tasks to be performed by one or more workers of the streaming platform 100. A task graph may contain task to be performed by a plurality of workers, in which case the task graph is divided into a plurality of task groups, each corresponds to a portion of the task graph into to meet the computational resource requirements, see for example U.S. patent application Ser. No. 14/448,915, entitled "A Method and System for a Graph Based Video Streaming Platform," incorporated by reference herein. The orchestrator then predicts a set of resource requirements necessary to process the media workflow utilizing the task graph.

FIG. 5A illustrates a task graph for a video workflow including predicted CPU and GPU requirements according to one embodiment of the invention. The task graph is for a channel (referred to as channel instead of workflow here to signify the workflow is a video stream to be distributed by a CDN after being processed by a video streaming platform), and an orchestrator cluster of the video streaming platform needs to predict its resource requirement so that it can optimize the allocation of resources to accommodate this channel.

The orchestrator cluster knows the characteristics of the video source and the desired operations (such as the desired audio/video transcoding and publishing) based on information such as an operator input 430 and the incoming data flow 180. The orchestrator cluster also has access of the platform performance profile (in its database such as the database 426 in one embodiment). Thus, the orchestrator cluster may predict the resource requirement of the channel. For the channel 502, the CPU and GPU usage prediction is listed under each task as illustrated in FIG. 5A. The predicted CPU/GPU usages are the results of plugging (1) a set of variable coefficients and a constant of a set of parameters for the task type in a platform performance profile (2) the set of corresponding video source characteristics into a linear equation. For example, the predicted CPU usage of the task of video 532 may be computed using $Y_1=0.000385802*X_1+0.00703426*X_2+0.131604014*X_3+1.138420996*X_4+(-0.045721915)*X_5+0.253087429*X_6+8.102607868*X_7+(-0.000929188)*X_8+(-29.18716796)$. The variable coefficients and the constant are from the platform performance profile illustrated in FIG. 3B. The values of $X_1$-$X_8$ are the variables of the video source characteristics corresponding to the variable coefficients, in the order of source bit rate, source height in pixels, source frame rate, whether the source is interlaced or not, output height in pixels, and output megapixels per second (MPps), the number of output layers, and the output bit rate in this example. The video source characteristics may be measured by the streaming platform 100 when available, they may also be provided by a channel creation request such as the operator input 430 or set to default values. The predicted average CPU usage is 21%, which may be the result of rounding up to the nearest integer. It is to be noted that rounding up (also referred to as ceiling) is always used in one embodiment.

Since the computation is to predict resource requirements, sometimes it is desirable to make the prediction more conservatively. Thus, in one embodiment, the calculated constant from the linear regression analysis may be added by a fixed value, and the resulting predicted resource requirement is higher. For example, for CPU usage prediction of the task of video 532 discussed herein above, in order to make a more conservative prediction, the calculated constant −29.18716796 may be artificially increased by 3, −29.18716796+3=−26.18716976 so that the linear equation used for predication of the CPU usage becomes $Y_1=0.000385802*X_1+0.00703426*X_2+0.131604014*X_3+1.138420996*X_4+(-0.045721915)*X_5+0.253087429*X_6+8.102607868*X_7+(-0.000929188)*X_8+(-26.18716796)$.
The modified prediction provide buffer room when allocating CPU resources for and it is desirable in some scenarios.

Additionally, for predicting the resource requirements of a task graph, the resource requirements of some tasks are predicted to be a constant value in one embodiment. For example, the predicted CPU usage of the audio 531 is 1.7% of a worker's CPU resource. The prediction is a result of plugging (1) the platform performance profile for the task of audio transcoding and (2) the characteristics of the video source into a linear equation. Since the CPU usage of the audio 531 is relatively small and relatively consistent across video sources and media workflows as compared to other task types, one may forgo the linear regression analysis and predict the CPU usage of 2% for all like-kind audio type in one embodiment. The predicted 2% CPU usage is considered worst case default for this type of task. While the estimation is less accurate compared to the linear regression analysis, the resulting simplification is more desirable in some scenarios.

It is to be noted that the prediction of resource requirements may utilize one or more machine-learning algorithms to allow the orchestrator cluster make better prediction over time. In which case, an earlier estimation of resource requirements is used for workers to execute processing tasks, and the worker may provide feedback about the accuracy of the prediction by measuring actual resource utilization during media workflow processing. Using the feedback, the orchestrator cluster may adjust its prediction of resource requirements for a same or similar processing task, workflow or video source in the future. For example, based on the feedback from the worker, the orchestrator cluster may adjust the constant value in a linear equation (e.g. instead of increasing by 3 as discussed above, increasing by 1 may be sufficient) or adjust the fixed value for other tasks (e.g., instead of setting the CPU usage of an audio task to be 2%, changing it to 3%). In one embodiment, when the prediction of the resource requirement diverges from the actual resource requirement over a certain threshold, the linear regression analysis model is to be revised. One or more independent variables in the utilized linear equation may be added or removed, so the values of the variable coefficients and the constant will be updated. The platform performance profile is updated with the updated sets of parameters for future prediction. Thus, the feedback loop may constantly improve the accuracy of the prediction of resource requirements.

After predicting the resource requirement for each task of the channel 502, the CPU/GPU usages of the channel 502 is determined: The GPU usage prediction is 24%, and the CPU usage is 5% (Input)+1.7% (Audio)+21% (Video)+3% (Publisher)=30.7% (rounding up to 31% in one embodiment). With the prediction of the channel to take 24% GPU usage and 31% CPU usage of a worker, the orchestrator cluster may determine which worker has available resources to accommodate the channel.

FIG. 5B illustrates an exemplary channel allocation in a worker of a video streaming platform according to one embodiment of the invention. The exemplary channel allocation 504 is based on processor usage of a set of channels. The channel allocation 504 is the allocation of a worker 512. Three channels are allocated to the worker: channels 1-3, with the aggregated CPU usage of 85% and GPU usage of 73%. The channel allocation is the result of the orchestrator cluster searching for the best fit worker which has the closest match in available resource to a channel to be allocated. There are known ways to optimize worker usage so that a worker is to be fully occupied with channels before the orchestrator cluster finds another worker.

In one embodiment, the leftover resources of a set of workers may be utilized by a channel distributed among the set of workers. For example, it is predicted that the worker 512 will has 85% CPU and 73% GPU taken by channels 1-3, and the remaining resources, 15% CPU and 27% GPU is insufficient to accommodate a channel 4, which is predicted to have a CPU/GPU usage identical to channel 1. In that case, some tasks of the task graph for channel 4 may be performed in worker 512, such as the ingesting, the audio transcoding, and the publishing, so that these tasks will take 10% CPU and no GPU; and the other task (the video transcoding) is allocated to another worker. In this way, the workers resources are used closer to its full capacity, and the client will only need to rent one or more additional workers when the resource consumption actually demands it. Thus, the prediction of the resource requirements necessary to perform the task graph result in better resource allocation in the worker for the corresponding client video sources.

Flow Diagrams

Figure 6:
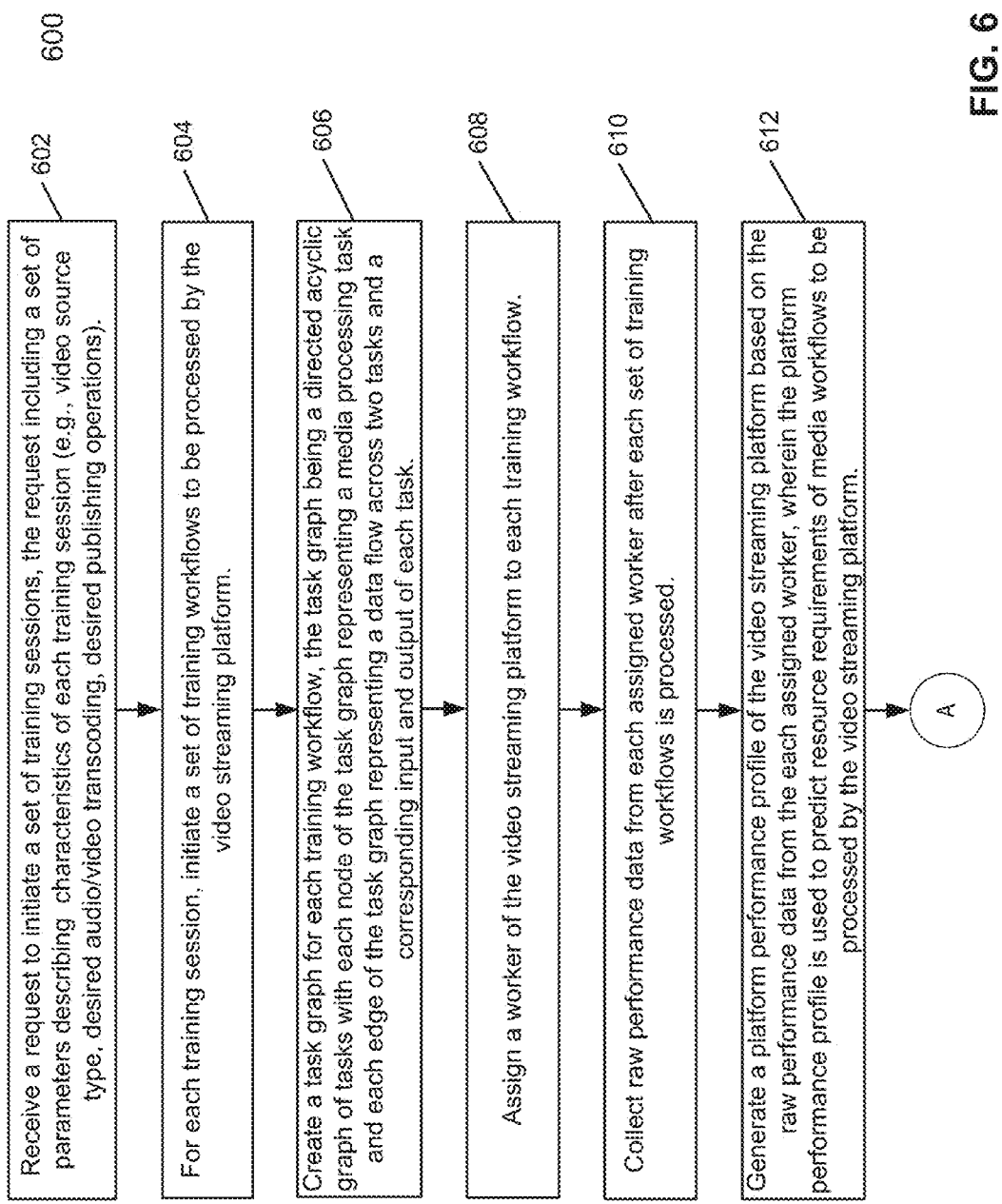
FIG. 6 is a flow diagram illustrating the operations of creating a platform performance profile of a video streaming platform according to one embodiment of the invention.

FIG. 6 is a flow diagram illustrating the operations of creating a platform performance profile of a video streaming platform according to one embodiment of the invention. Method 600 may be implemented in the orchestrator cluster 120 and the training engine 200 as illustrated in FIG. 1.

At reference 602, a request is received to initiate a set of training sessions. The request includes a set of parameters describing characteristics of each training session in the set of training sessions. In one embodiment, the set of parameters includes values for characteristics of the set of training sessions including video source codec, output audio/video transcoding, and publishing operations. The request is a training instruction to a training engine of the video streaming platform in one embodiment.

At reference 604, for each training session in the set of training sessions, a set of training workflows to be processed by the video streaming platform is initiated. Then at reference 606, a task graph for each training workflow in the set of training workflows is created. The task graph is a directed acyclic graph of tasks with each node of the task graph representing a media processing task and each edge of the task graph representing a data flow across two tasks and a corresponding input and output of each task such as illustrated in FIG. 2B.

Then at reference 608, a worker from a set of workers of the video streaming platform is assigned to each training session. In one embodiment, all training workflows for a particular training session are assigned to one worker, so that the performance of the worker may be measured under medium-high load level, which is a more realistic operational environment.

The raw performance data from each assigned worker is collected after each set of training workflows is processed at reference 610. The processing of the workflows of the training sessions at various workers may be performed in parallel, up to a number of available workers. In alternative, the process may be serialized so that only one worker will perform the training workflows of a session at a given time. At reference 612, a platform performance profile of the video streaming platform is generated based on the raw performance data from each assigned worker, and the platform performance profile is used to predict resource requirements of media workflows to be processed by the video streaming platform. The platform performance profile enables predicative modeling of resource requirements for specific task types (such as ingesting, audio/video transcoding, and publishing) in a media workflow in one embodiment.

In one embodiment, as discussed herein above, the generation of the platform performance profile includes performing a linear regression on the raw performance data collected. The linear regression results in a set of coefficients (e.g., including variable coefficients and a constant) from the raw performance data from the one or more assigned workers in one embodiment. In one embodiment, the raw performance data include metrics on a processor usage, such as the processor usage of a central processing unit and/or a graphic processing unit. The generation of the platform performance profile is discussed in more details in relation to FIGS. 3A-C.

Figure 7A:
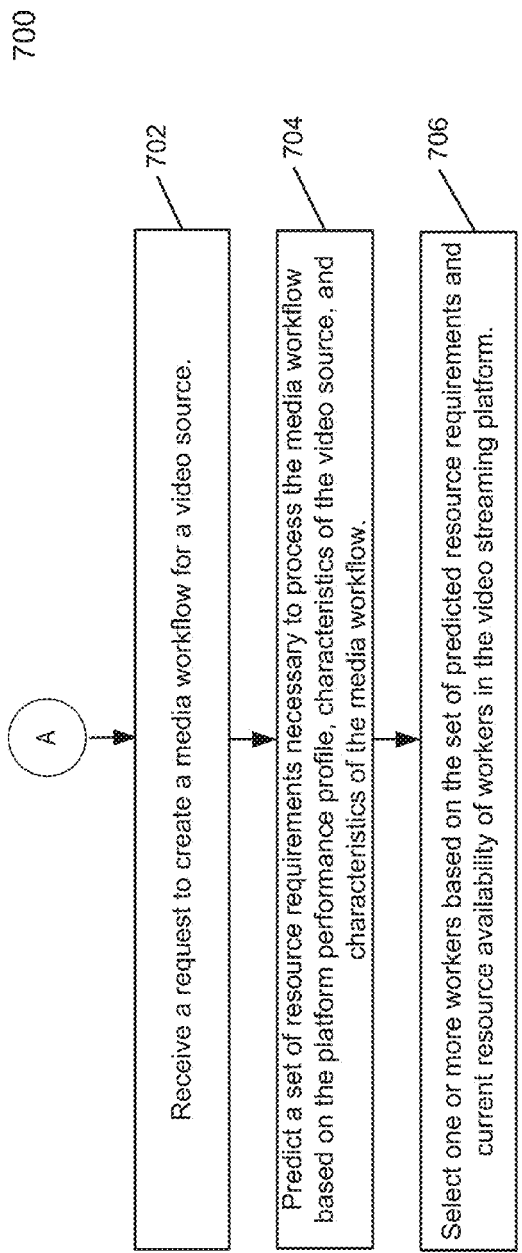
FIG. 7A is a flow diagram illustrating the usage of a platform performance profile according to one embodiment of the invention.

In one embodiment, method 600 continues to cycle A, which is the starting point of FIG. 7A, which is a flow diagram illustrating the usage of a platform performance profile according to one embodiment of the invention.

At reference 702, a request is received to create a media workflow for a video source. The request includes a set of parameters describing characteristics of the video source in one embodiment. In one embodiment, the set of parameters includes values for characteristics of the video source including video source codec, output audio/video transcoding, and publishing operations. The request is an operator input such as the operator input 430 in one embodiment.

At reference 704, a set of resource requirements necessary to process the media workflow is predicted based on the platform performance profile, characteristics of the video source, and characteristics of the media workflow. Based on the set of predicted resource requirements and current resource availability of workers in the video streaming platform, at reference 706, one or more workers in the video streaming platform are selected.

Figure 7B:
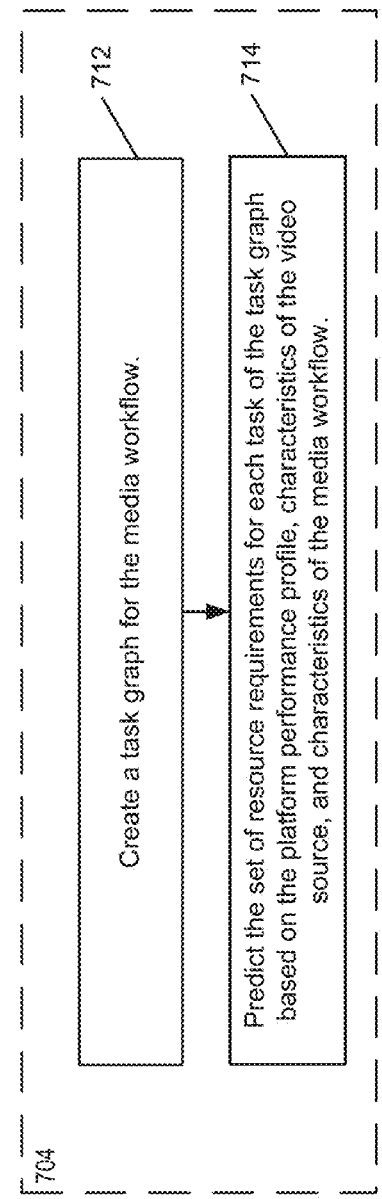
FIG. 7B is a flow diagram illustrating the prediction of the resource requirements according to one embodiment of the invention.

FIG. 7B is a flow diagram illustrating the prediction of the resource requirements according to one embodiment of the invention. In one embodiment, the flow diagram is a zoom-in of reference 704. At reference 712, a task graph is created to for a workflow of a video source. Then at reference 714, the set of resource requirements for each task of the task graph is predicted based on the platform performance profile, the characteristics of the video source, and characteristics of the media workflow.

Figure 8:
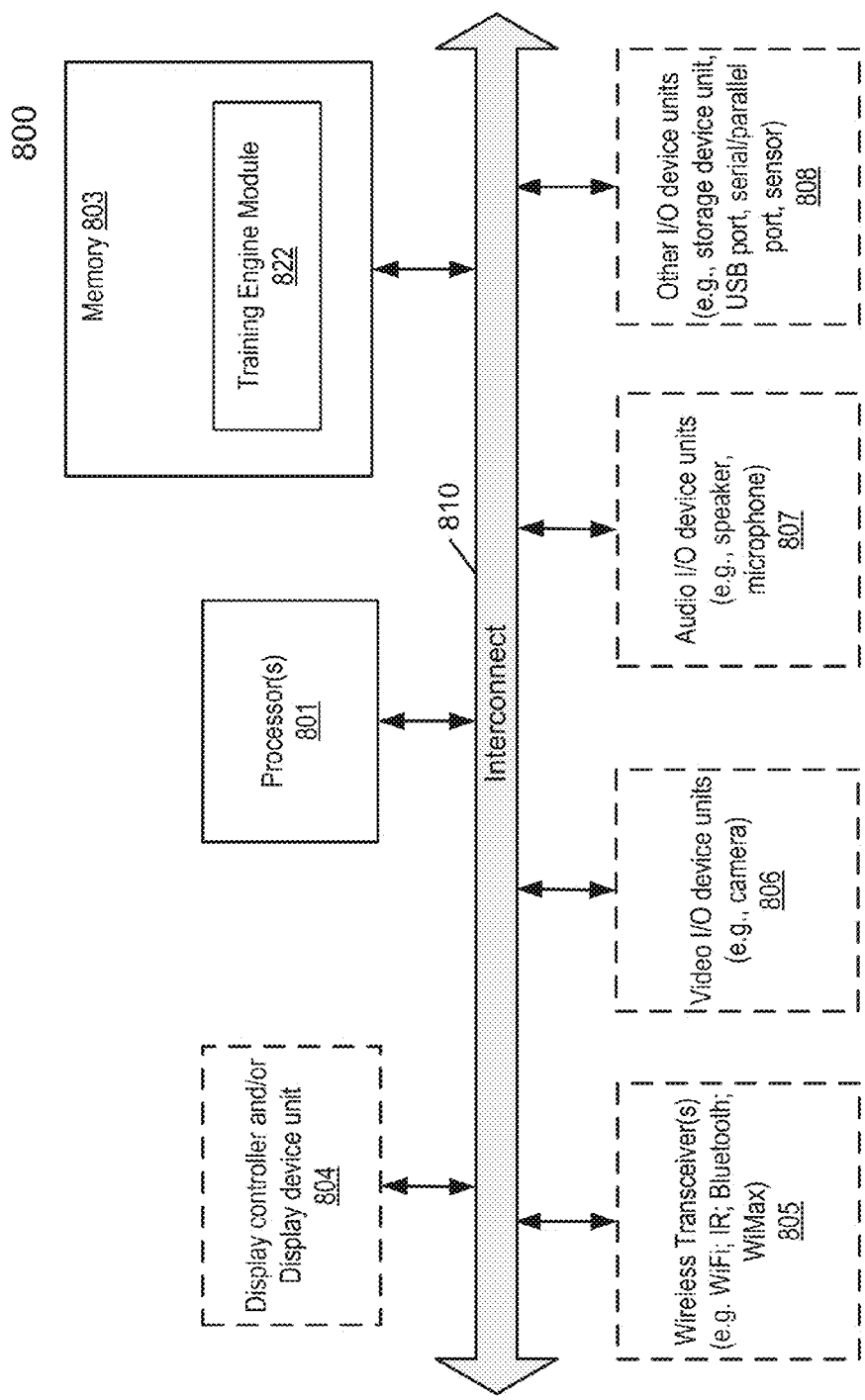
FIG. 8 is a block diagram illustrating an electronic device that may serve as a training engine of a video streaming platform in a cloud computing environment according to one embodiment of the invention.

In one embodiment, all the steps of FIGS. 6-8 are performed by an orchestrator cluster such as the integrated orchestrator 202 illustrated in FIG. 1. In an alternate embodiment, some steps (such as references 602-612) are performed by a training engine such as the training engine 200, while other steps (such as references 702-714) are performed by the orchestrator cluster when the training engine is implemented outside of the orchestrator cluster.

Electronic Devices Implementing Embodiments of the Invention

FIG. 8 is a block diagram illustrating an electronic device that may serve as a training engine of a video streaming platform in a cloud computing environment according to one embodiment of the invention. The electronic device may be a computing device (e.g., a computer server) of a cloud computing environment). The system 800 may represent any of the training engine described above performing any of the processes or methods for training and generating the platform performance profile described above. The system 800 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 800 is intended to show a high level view of many components of the computing system. However, it is to be understood that additional components may be present in certain implementations and furthermore, different arrangement of the components shown may occur in other implementations.

In one embodiment, the system 800 includes a processor 801, memory 803, and optionally device units 804-808 that are interconnected via a bus or an interconnect 810. A processor 801 may represent a single processor or multiple processors with a single processor core or multiple processor cores included therein. The processor 801 may represent one or more general-purpose processors such as a microprocessor, a central processing unit (CPU), or processing device. More particularly, the processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 801 may communicate with the memory 803, which in an embodiment can be implemented via multiple memory devices to provide for a given amount of system memory. The memory 803 may include one or more volatile storage (or memory) devices such as random access memory (RAM), dynamic RAM (DRAM), synchronous DRAM (SDRAM), static RAM (SRAM), or other types of storage devices. The memory 803 may store information including sequences of instructions that are executed by the processor 801, or any other device units. For example, executable code and/or data of a variety of operating systems, device drivers, firmware (e.g., input output basic system or BIOS), and/or applications can be loaded in the memory 803 and executed by the processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 803 contains a training engine module 822, which may contain instructions to perform the operations of generating a platform performance profile as discussed herein above in relation to FIGS. 1-3 and 6-7. The processor 801 may instantiate a set of instances of training engines such as the training engine 200 from memory 803 for generating the platform performance profile including a set of parameters for each task type of a task graph in a video streaming platform.

The system 800 may optionally further include input/output (I/O) devices such as the device units 804-808, including display control and/or display device unit 804, wireless transceiver(s) 805, video I/O device unit(s) 806, audio I/O device unit(s) 807, and other I/O device units 808 as illustrated. The wireless transceiver(s) 805 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The system 800 may also include an ultrasound device unit (not shown) for transmitting a conference session code.

The video I/O device unit 806 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 807 may include a speaker and/or a microphone to facilitate voice-enabled functions, such as voice recognition, voice replication, digital recording, and/or telephony functions. Other optional devices 808 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 808 may further include certain sensors coupled to the interconnect 810 via a sensor hub (not shown), while other devices such as a keyboard or thermal sensor may be controlled by an embedded controller (not shown), dependent upon the specific configuration or design of the system 800.

The system 800 may be coupled to a video streaming platform such as the streaming platform 100, and the streaming platform may include an orchestrator cluster, a stream coordinator, and one or more worker cluster (working and/or backup), all discussed herein. The system 800 may perform methods discussed herein above relating to FIGS. 6-7.

Note that while the system 800 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Figure 9:
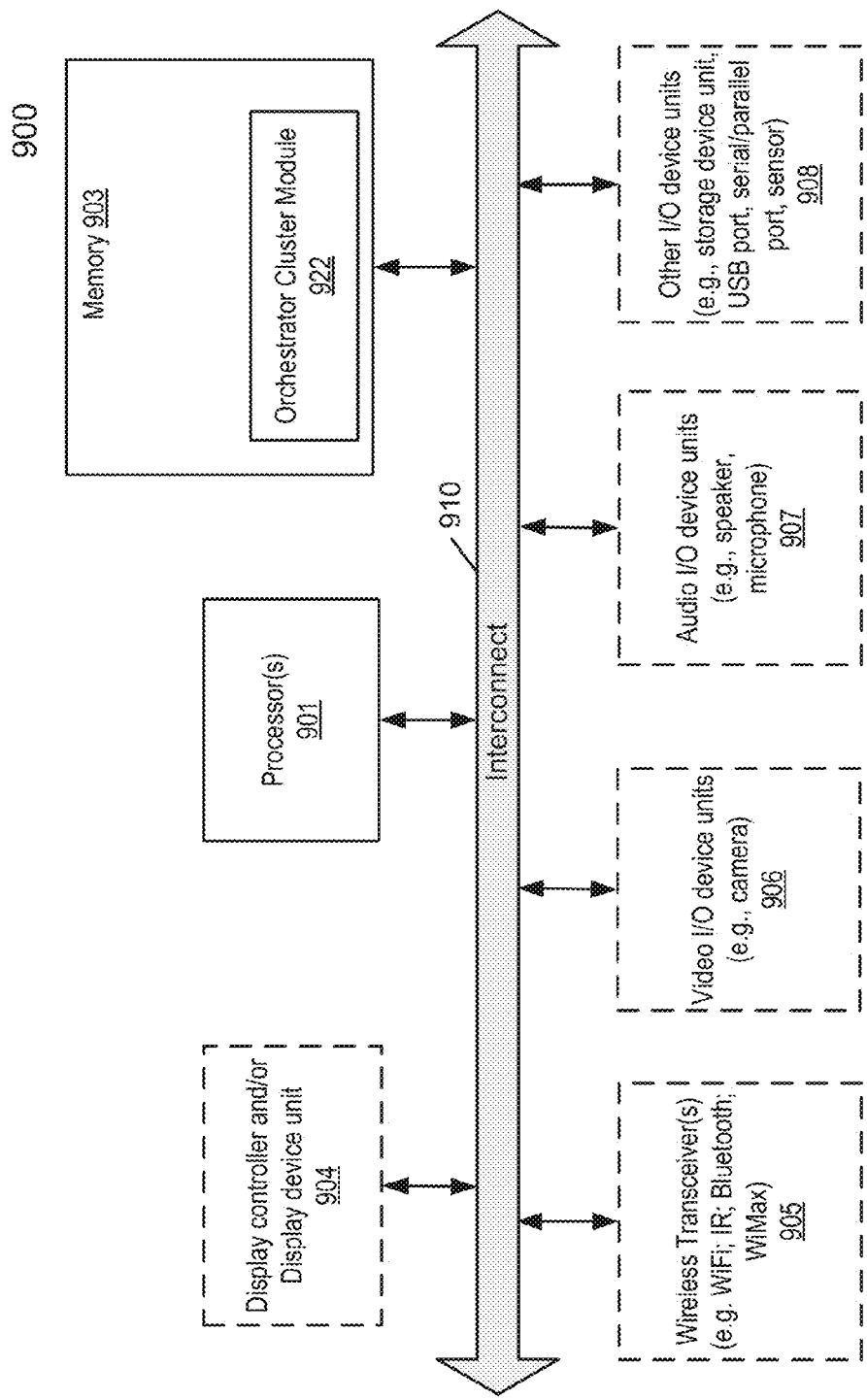
FIG. 9 is a block diagram illustrating an electronic device that may serve as an orchestrator cluster of a video streaming platform in a cloud computing environment according to one embodiment of the invention.

FIG. 9 is a block diagram illustrating an electronic device that may serve as an orchestrator cluster of a video streaming platform in a cloud computing environment according to one embodiment of the invention. FIG. 9 is similar to FIG. 8, and the same or similar references indicate elements or components having the same or similar functionalities. One difference is that memory 903 contains an orchestrator cluster module 922, which may perform operations of an orchestrator cluster discussed herein above in relation to FIGS. 4-5 and the method 700. In one embodiment, the orchestrator cluster contains a training engine module thus the orchestrator cluster is referred to as an integrated orchestrator cluster such as the integrated orchestrator cluster 202, and the orchestrator cluster will perform operations similar to the ones performed by as the integrated orchestrator cluster 202 as discussed herein.

Some portions of the preceding detailed descriptions have been presented in terms of algorithms and symbolic representations of operations on data bits within a computer memory. These algorithmic descriptions and representations are the ways used by those skilled in video processing technology to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

It is to be noted that the operations of the flow diagrams in FIGS. 6-7 are described with reference to the exemplary embodiment electronic devices of FIGS. 8-9. However, it should be understood that the operations of flow diagrams can be performed by embodiments of the invention other than those discussed with reference to FIGS. 8-9, and the embodiments discussed with reference to FIG. 8-9 can perform operations different than those discussed with reference to the flow diagrams of FIGS. 6-7.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method executed by an electronic device implementing a video streaming platform, the method to optimize resource utilization while processing media workflows by the video streaming platform, the method comprising:

receiving a request to initiate a set of training sessions, the request including a set of parameters describing characteristics of each training session in the set of training sessions;

for each training session in the set of training sessions, initiating a set of training workflows to be processed by the video streaming platform;

creating a task graph for each training workflow in the set of training workflows, the task graph being a directed acyclic graph of tasks with each node of the task graph representing a media processing task and each edge of the task graph representing a data flow across two tasks and a corresponding input and output of each task;

assigning a worker from a set of workers of the video streaming platform to each training session;

collecting raw performance data from each assigned worker after each set of training workflows is processed;

generating a platform performance profile of the video streaming platform based on the raw performance data from the each assigned worker, wherein the platform performance profile is used to predict resource requirements of media workflows to be processed by the video streaming platform;

receiving a request to create a media workflow for a video source;

predicting a set of resource requirements necessary to process the media workflow based on the platform performance profile and characteristics of the video source, wherein the predicting of the set of resource requirements includes creating a task graph for the media workflow, and predicting the set of resource requirements for each task of the task graph based on the platform performance profile and the characteristics of the video source; and selecting one or more workers based on the set of predicted resource requirements and current resource availability of workers in the video streaming platform.

2. The method of claim 1, wherein the set of parameters includes values for characteristics of the set of training sessions including video source codec, output audio/video transcoding, and publishing operations.

3. The method of claim 1, wherein the platform performance profile enables predictive modeling of resource requirements for specific task types in a media workflow.

4. The method of claim 1, wherein generating the platform performance profile comprises performing a linear regression on the raw performance data.

5. The method of claim 4, wherein the linear regression comprises generating a set of coefficients from the raw performance data from the worker.

6. The method of claim 1, wherein the raw performance data includes metrics on a processor usage.

7. The method of claim 6, wherein the processor usage includes a usage of a graphic processing unit.

8. An electronic device to serve as an orchestrator cluster of a video streaming platform, the electronic device comprising:
   a processor; and
   a non-transitory machine-readable storage medium coupled to the processor, the non-transitory machine-readable storage medium containing operations executable by the processor, wherein the electronic device is operative to receive a request to initiate a set of training sessions, the request including a set of parameters describing characteristics of each training session in the set of training sessions, for each training session in the set of training sessions, to initiate a set of training workflows to be processed by the video streaming platform, to create a task graph for each training workflow in the set of training workflows, the task graph being a directed acyclic graph of tasks with each node of the task graph representing a media processing task and each edge of the task graph representing a data flow across two tasks and a corresponding input and output of each task, to assign a worker from a set of workers of the video streaming platform to each training session, to collect raw performance data from each assigned worker after each set of training workflows is processed, to generate a platform performance profile of the video streaming platform based on the raw performance data from the each assigned worker, wherein the platform performance profile is used to predict resource requirements of media workflows to be processed by the video streaming platform, to receive a request to create a media workflow for a video source, to predict a set of resource requirements necessary to process the media workflow based on the platform performance profile and characteristics of the video source, wherein prediction of the set of resource requirements includes creating a task graph for the media workflow, and predicting the set of resource requirements for each task of the task graph based on the platform performance profile and the characteristics of the video source, and to select one or more workers based on the set of predicted resource requirements and current resource availability of workers in the video streaming platform.

9. The electronic device of claim 8, wherein the generation of the platform performance profile comprises performing a linear regression on the raw performance data.

10. The electronic device of claim 9, wherein the linear regression comprises generating a set of coefficients from the raw performance from the worker.

11. The electronic device of claim 8, wherein the raw performance data includes metrics on a processor usage.

12. A non-transitory machine-readable storage medium having instructions stored therein, which when executed by a processor, cause the processor to perform operations in an electronic device implementing a video streaming platform, wherein the operations optimize resource utilization while processing media workflows by the video streaming platform, the operations comprising:
   receiving a request to initiate a set of training sessions, the request including a set of parameters describing characteristics of each training session in the set of training sessions;
   for each training session in the set of training sessions, initiating a set of training workflows to be processed by the video streaming platform;
   creating a task graph for each training workflow in the set of training workflows, the task graph being a directed acyclic graph of tasks with each node of the task graph representing a media processing task and each edge of the task graph representing a data flow across two tasks and a corresponding input and output of each task;
   assigning a worker from a set of workers of the video streaming platform to each training session;
   collecting raw performance data from each assigned worker after each set of training workflows is processed;
   generating a platform performance profile of the video streaming platform based on the raw performance data from the each assigned worker, wherein the platform performance profile is used to predict resource requirements of media workflows to be processed by the video streaming platform;
   receiving a request to create a media workflow for a video source;
   predicting a set of resource requirements necessary to process the media workflow based on the platform performance profile and characteristics of the video source, wherein the predicting of the set of resource requirements includes creating a task graph for the media workflow, and predicting the set of resource requirements for each task of the task graph based on the platform performance profile and the characteristics of the video source; and
   selecting one or more workers based on the set of predicted resource requirements and current resource availability of workers in the video streaming platform.

13. The storage medium of claim 12, wherein the platform performance profile enables predictive modeling of resource requirements for specific task types in a media workflow.

14. The storage medium of claim 12, wherein generating the platform performance profile comprises performing a linear regression on the raw performance data.

15. The storage medium of claim 12, wherein the raw performance data includes metrics on a processor usage.

\* \* \* \* \*